United States Patent [19]
Beigang

[11] Patent Number: 6,142,033
[45] Date of Patent: Nov. 7, 2000

[54] SHAFT-HUB UNIT

[76] Inventor: Wolfgang Beigang, Felderhoferbrucke 24, D-53809 Ruppichteroth, Germany

[21] Appl. No.: 09/230,668

[22] PCT Filed: May 8, 1998

[86] PCT No.: PCT/EP98/02710

§ 371 Date: Oct. 21, 1999

§ 102(e) Date: Oct. 21, 1999

[87] PCT Pub. No.: WO98/54476

PCT Pub. Date: Dec. 3, 1998

[30] Foreign Application Priority Data

May 31, 1997 [DE] Germany .......................... 197 22 917

[51] Int. Cl.$^7$ ....................................... F16D 1/06
[52] U.S. Cl. ................................. 74/457; 74/460
[58] Field of Search ....................... 74/457, 460

[56] References Cited

U.S. PATENT DOCUMENTS

| | | | |
|---|---|---|---|
| 4,744,263 | 5/1988 | Kuiken | 74/457 |
| 5,605,518 | 2/1997 | Kogure et al. | 74/457 |

*Primary Examiner*—David Fenstermacher

[57] ABSTRACT

A shaft/hub unit having a toothing assembly for transmitting torque, comprising a shaft (1) with shaft toothing (5) and a hub (2) with hub toothing (7), which sets of toothing engage one another, with torque being introduced by a shaft shank (4) at whose end there is provided the shaft toothing (5) and with the tooth profile of the shaft toothing (5), in the longitudinal direction, following a variable course, wherein the shaft toothing (5) comprises a major diameter which, in the longitudinal direction, follows a constant course and wherein the hub toothing (7) comprises a base diameter which, in the longitudinal direction, follows a constant course, wherein the toothing assembly comprises at least two axially extending portions (9, 10) in which each base diameter of the shaft toothing (5) follows a constant course and in which each major diameter of the hub toothing (7) follows a constant course, and wherein, of the each two adjoining portions, the portion facing the shaft shank (4) comprises the greater base diameter of the shaft toothing (5) and the greater major diameter of the hub toothing (7), and wherein, of each two adjoining portions, the portion facing the shaft shank (4) comprises a tooth profile of the shaft toothing (5), which tooth profile corresponds to a head portion of the adjoining portion, which head portion forms the upper part of the tooth profile.

10 Claims, 7 Drawing Sheets

SHAFT-HUB UNIT

DESCRIPTION

The invention relates to a shaft/hub unit having a toothing assembly for transmitting torque, comprising a shaft with shaft toothing and a hub with hub toothing, which sets of toothing engage one another, with torque being introduced by a shaft shank at whose end there is provided the shaft toothing and with the tooth profile of the shaft toothing, in the longitudinal direction, following a variable course.

Shaft/hub units of said type are used in particular for rotationally fast connections between an axle shaft and a component of a universal joint in the driveline of a vehicle.

DE 44 15 033 C1 describes such a shaft/hub unit wherein the tooth profile of the shaft toothing is variable in the longitudinal direction and wherein the tooth height of the shaft toothing continuously decreases in a run-out portion. As the shaft toothing is provided in the form of involute toothing and the hub toothing in the form of straight-flanked toothing, a line contact exists between the two sets of toothing. In consequence, a tooth flank play occurs above and below the line contact. In a run-out portion in which the tooth height of the shaft toothing is shorter than the height of the line contact, the teeth of the shaft toothing and those of the hub toothing do not contact one another. An introduction of torque leads to shaft torsion in the run-out portion, with the flanks of the shaft toothing, to an increasing extent, axially contacting the flanks of the hub toothing. The usually occurring stress peak at the shaft shank end of the toothing assembly is thus reduced and the portion of high stress values is extended to a greater length of the toothing assembly. The disadvantage of said shaft/hub unit is that the run-out portion can only be produced by an additional chip-forming machining operation.

FR 1 581 658 discloses a shaft with a set of shaft toothing for a shaft/hub unit wherein the base diameter and the major diameter in the longitudinal direction are positioned on a cone, with the tooth height being constant along the entire length of the toothing assembly. The base diameter and the major diameter are increased towards the shaft end where the torque is introduced. However, said type of toothing can be produced neither by established production methods with an axial direction of feed such as broaching or drawing nor by rolling with parallel rolling means. Furthermore, the axial position of the hub on the shaft depends on the tolerances of the cone. In the case of flat opening angles of the outer cone faces, even slight deviations in angle have a substantial effect on the axial position of the hub. For many applications this is unacceptable.

It is the object of the present invention to provide a shaft-hub unit wherein, with a given torque, the stresses at the shaft shank end of a toothing assembly are as low as possible and the toothing of which can be produced by simple production methods.

The objective is achieved in that the shaft toothing comprises a major diameter which, in the longitudinal direction, follows a constant course and that the hub toothing comprises a base diameter which, in the longitudinal direction, follows a constant course; that the toothing assembly comprises at least two axially extending portions in which each base diameter of the shaft toothing follows a constant course and in which each major diameter of the hub toothing follows a constant course, and that of each two adjoining portions, the portion facing the shaft shank comprises the greater base diameter of the shaft toothing and the greater major diameter of the hub toothing; and that, of each two adjoining portions, the portion facing the shaft shank comprises a tooth profile of the shaft toothing, which tooth profile corresponds to a head portion of the adjoining portion, which head portion forms the upper part of the tooth profile.

By increasing the base diameters from portion to portion towards the shaft shank, the resistance moment of the shaft becomes greater. In consequence, the stresses in the shaft shank end of the toothing assembly are reduced. Because, of each two adjoining portions, the portion facing the shaft shank comprises a tooth profile of the shaft toothing, which tooth profile corresponds to the head portion forming the upper part of the tooth profile of the adjoining portion, with the teeth on any circle diameter, along the entire toothing assembly, thus having the same tooth thickness, it is possible for both the shaft toothings and the hub toothings to be produced by production methods with axial directions of feed.

One embodiment consists in that the number of portions extends towards infinity, so that, in practical terms, the base diameter of the shaft toothing and the major diameter of the hub toothing, in the longitudinal direction, are positioned on a cone.

According to one advantageous embodiment, it is proposed that, of the tooth profiles of each two adjoining portions, the tooth profile of the shaft toothing of the portion facing away from the shaft shank is widened in steps below the head portion forming the upper part of the tooth profile whose profile corresponds to the tooth profile of the adjoining portion; and that the tooth flanks of the shaft toothing of the portion positioned at the shaft end contacts the tooth flanks of the hub toothing in only one tooth base portion forming the lower part of the tooth profile. With the exception of the portion positioned at the shaft shank end of the toothing assembly, all portions comprise tooth thickness steps of the shaft toothing. Only the base portion of the shaft toothing of the portion being furthest removed from the shaft shank, which base portion forms the lower part of the tooth profile, engages the hub toothing without play. In all the remaining portions, the flanks of the shaft toothing comprise play relative to the flanks of the hub toothing. As a result, when torque is introduced, the shaft, in those portions wherein the tooth flanks of the shaft toothing and those of the hub toothing do not contact one another, is able to twist until the flanks in all portions contact one another. Because the flanks of the shaft toothing axially, to an increasing extent, come into contact with the flanks of the hub toothing, the portion participating in the transmission of torque is extended to a greater length of the toothing assembly. As compared to a toothing assembly wherein the base diameter of the shaft toothing and the major diameter of the hub toothing are constant along the entire length of the toothing assembly, this embodiment features lower maximum stresses.

According to a further advantageous embodiment, there are provided portions of transition in which the value of the base diameter of the shaft toothing follows a continuous function in the longitudinal direction from the base diameter of the one adjoining portion to the base diameter of the other adjoining portion and in which the value of the major diameter of the hub toothing follows a continuous function in the longitudinal direction from the major diameter of the one portion to the major diameter of the other portion. In this way, it is possible to avoid sharp-edged steps between the portions. This prevents disadvantageous stress peaks due to notch effects and it also simplifies the production of the toothing.

According to one embodiment, it is possible for both the portion of transition of the base diameter of the shaft toothing and the major diameter of the hub toothing to extend on a cone.

According to a further embodiment it is proposed that, for the purpose of axially securing the hub on the shaft, there is provided an annular groove in the shaft toothing and an opposed annular groove in the hub toothing, which grooves, jointly, accommodate axial securing means, especially in the form of a retaining ring with a round cross-section. In order to avoid that said retaining ring unintentionally slips off due to tooth heights being too short, the annular grooves are arranged in the portion which is furthest removed from the shaft shank. In this way, it is ensured that the retaining ring with the round cross-section is securely supported on the flanks of the annular groove. The axial position of the hub relative to the shaft is influenced only by the tolerances of the annular grooves and those of the axial securing means.

Preferred embodiments will be described with reference to the subsequent drawings wherein FIG. 1 is a longitudinal section through a shaft/hub unit in accordance with the invention.

Figure 1:
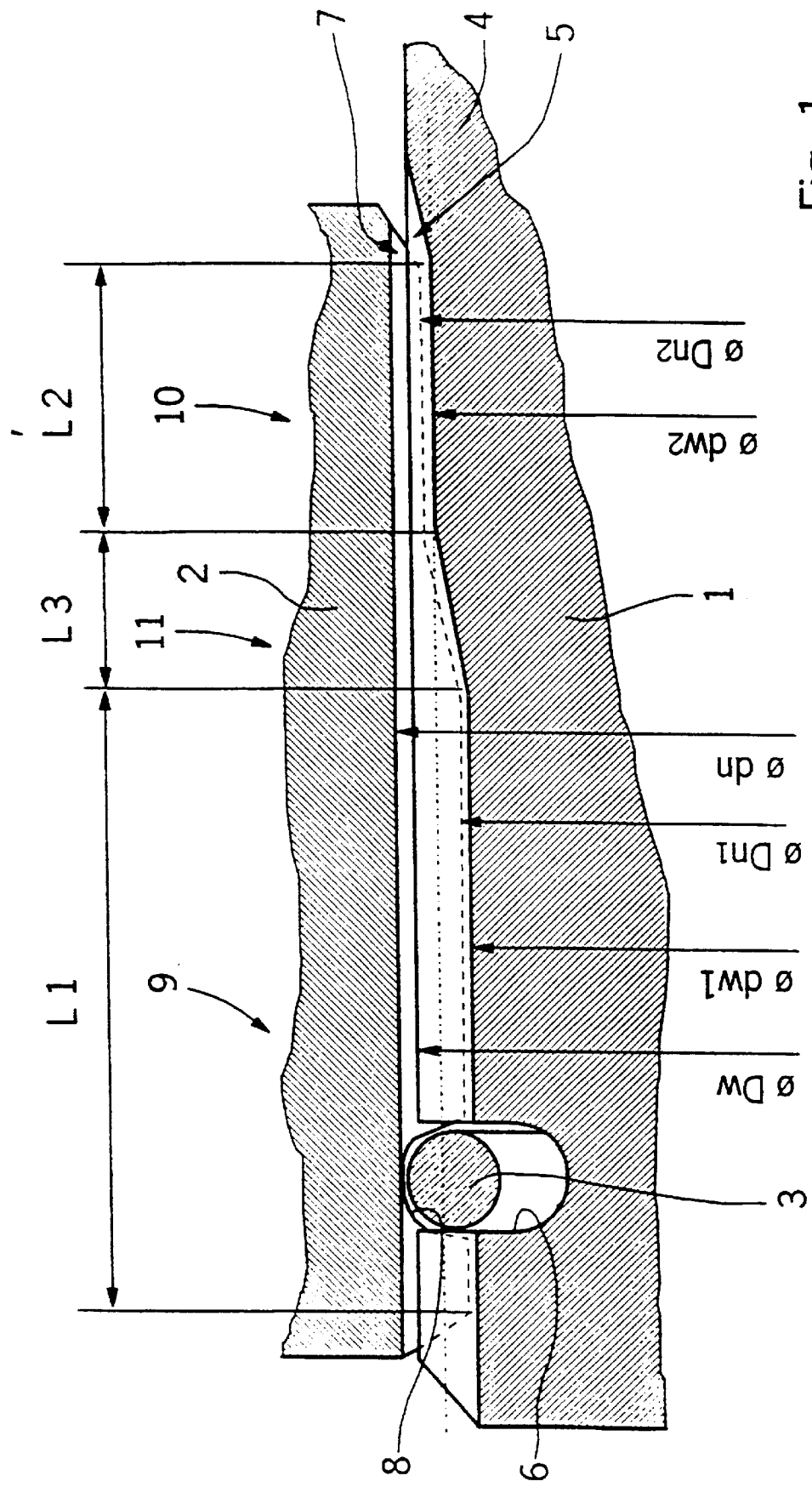

FIG. 1 shows part of a longitudinal section through an inventive shaft/hub unit, consisting of a shaft 1, a hub 2 and a retaining ring 3 with a round cross-section. The shaft 1 comprises a shaft shank 4 by means of which torque can be introduced into the shaft/hub unit. Furthermore, the shaft 1, at the shaft end facing away from the shaft shank 4, comprises shaft toothing 5 and an annular groove 6. The hub 2 comprises hub toothing 7 and an annular groove 8. The toothing assembly consisting of shaft toothing 5 and hub toothing 7 comprises a first portion 9, a second portion 10 and a portion of transition 11, with the major diameter of the shaft toothing assuming the constant value Dw in all three portions. The base diameter of the hub toothing is also constant is all three portions and has the value dn. The first portion 9 which faces away from the shaft shank 4 has the length L1, with the shaft toothing 5 having a base diameter with the value dw1 and with the hub toothing 7 having a major diameter with the value Dn1.

The second portion 10 with the length L2 faces the shaft shank 4. In said portion 10, the shaft toothing 5 has a base diameter with the value dw2 which is greater than the value of the base diameter dw1 of the first portion 9. The hub toothing 7 in the second portion 10 has a major diameter with the value Dn2 which is greater than the value of the major diameter Dn1 of the first portion 9. Between said portions 9, 10, there is positioned the portion of transition 11 having the length L3, in which portion 11 the base diameter of the shaft toothing 5 and the major diameter of the hub toothing 7, in the longitudinal direction, increase constantly from the first portion 9 to the second portion 10, with the base diameter, in the longitudinal direction, extending from the value dw1 to the value dw2 and with the major diameter of the hub toothing extending from the value Dn1 to the value Dn2. In the first portion 9, there are provided the annular grooves 6, 8 which are engaged by the round retaining ring 3 for axially securing the hub 2 relative to the shaft 1.

Figure 2:
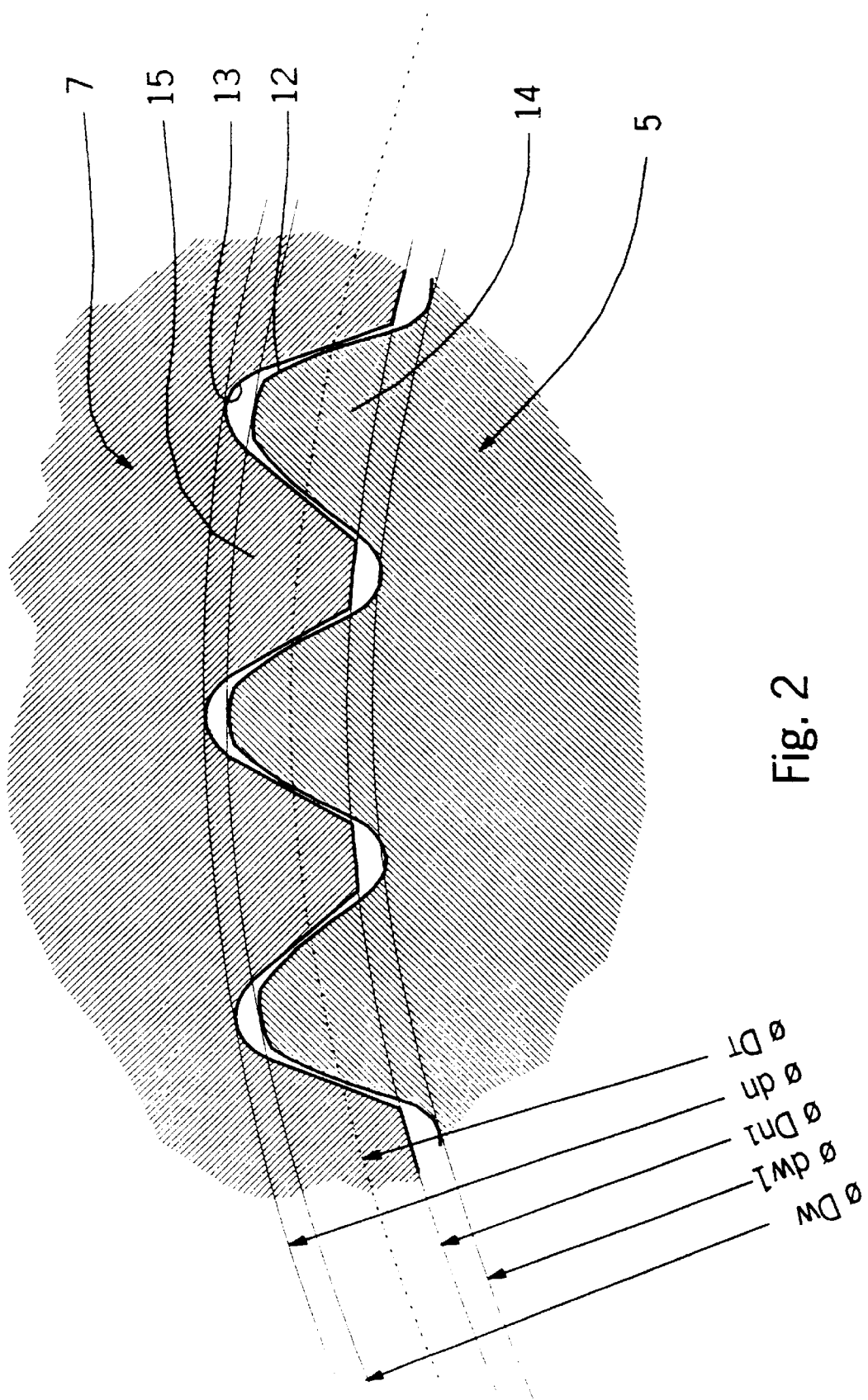
FIG. 2 is a cross-section through an inventive shaft/hub unit according to FIG. 1 in the portion which faces away from the shaft shank.

FIG. 2 shows part of a cross-section through an inventive shaft/hub unit in the first portion 9 according to FIG. 1. The teeth 14 of the shaft toothing 5 comprise convex tooth flanks 12, whereas the teeth 15 of the hub toothing 7 are provided with straight tooth flanks 13. The tooth flanks 12, 13 contact one another in the portion of the pitch diameter DT. The shaft toothing 5 has a base diameter with the value dw1 and a major diameter with the value Dw. The hub toothing 7 has a base diameter with the value dn and a major diameter with the value Dn1.

Figure 3:
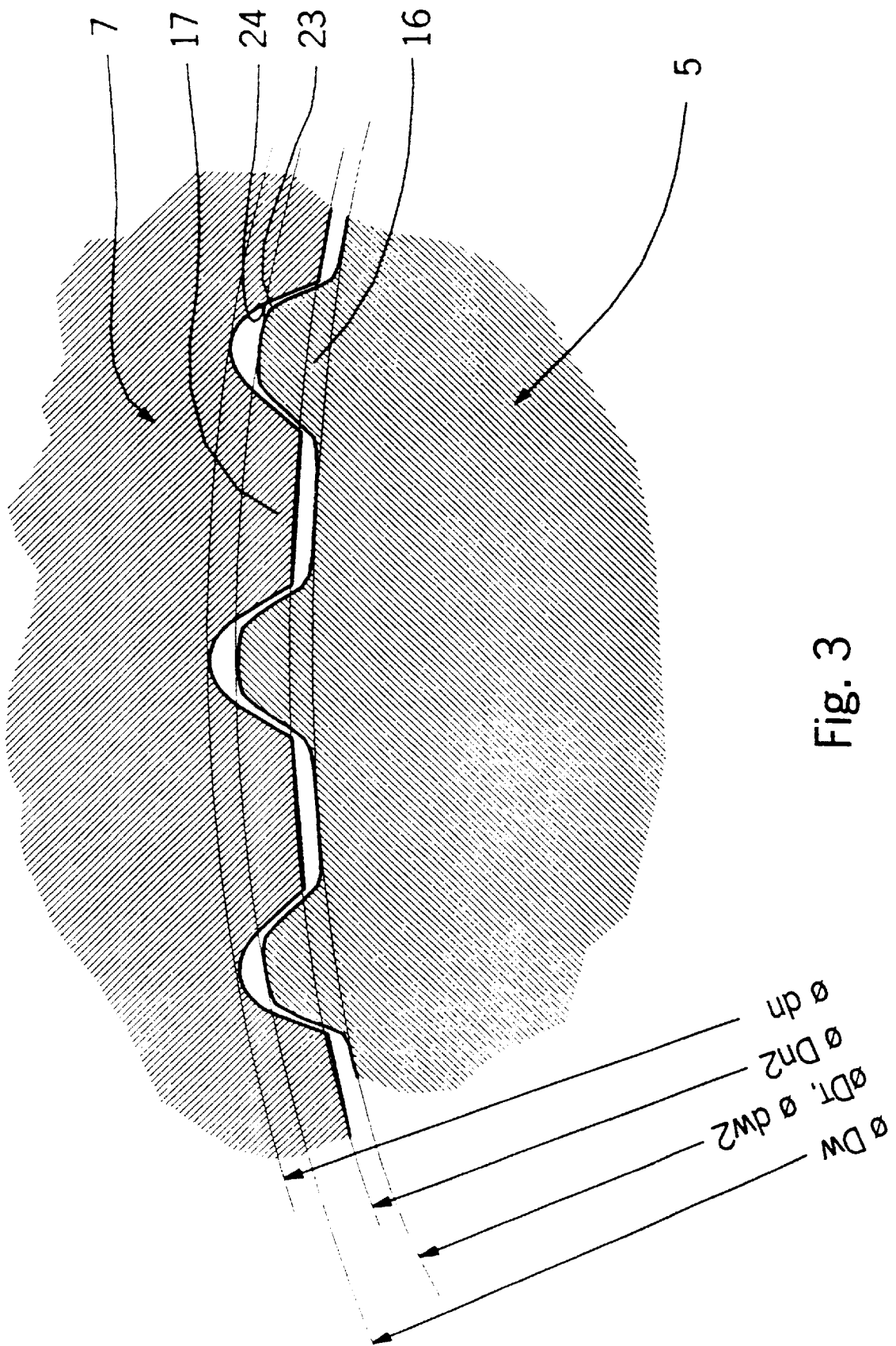
FIG. 3 is a cross-section through an inventive shaft/hub unit according to FIG. 1 in the portion which faces the shaft shank.

FIG. 3 shows part of a cross-section through an inventive shaft/hub unit in the portion 10 according to FIG. 1. The tooth flanks 23 of the shaft toothing 5 contact the tooth flanks 24 of the hub toothing 7 in the portion of the pitch diameter DT. The tooth heights of the teeth 16, 17 are smaller in portion 10 than in portion 9 according to FIG. 1. When the major diameter of the shaft toothing 5 and the base diameter of the hub toothing 7 are identical, the base diameter of the shaft toothing 5 and the major diameter of the hub toothing 7 each have a greater value in portion 10 than the comparable circle diameters in portion 9 according to FIG. 2. The teeth 16 of the shaft toothing 5 have the same cross-section as the teeth 14 according to FIG. 2 between the pitch diameter DT and the major diameter Dw. Between the pitch diameter DT and the base diameter dn, the teeth 17 of the hub toothing 7 have the same cross-section as the teeth 15 according to FIG. 2.

Figure 4:
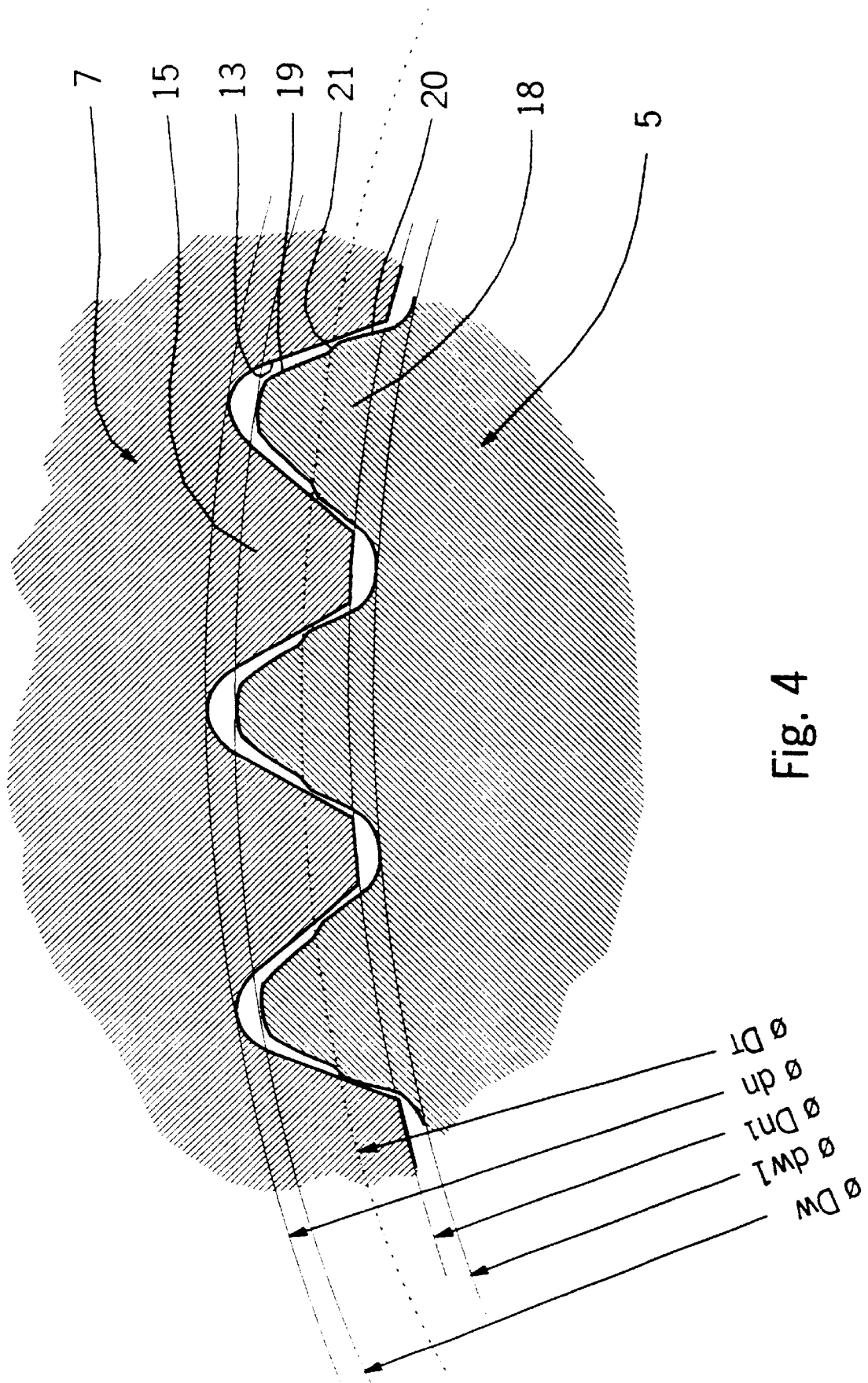

FIG. 4 shows part of a cross-section through the shaft/hub unit in portion 9 according to FIG. 1. The hub toothing 7 is identical to the hub toothing in FIG. 2. However, the teeth 18 of the shaft toothing 5 have a cross-section which widens in steps from the major diameter to the base diameter, with the step 21 being positioned in the portion of the pitch diameter DT. The cross-section of the teeth 18 between the pitch diameter DT and the base diameter dw1 corresponds to the comparable cross-section of the teeth 14 in FIG. 2. The tooth flanks 20 of the teeth 18 of the shaft toothing 5 thus contact the tooth flanks 13 of the teeth 15 of the hub toothing 7 in the portion of the pitch diameter DT. The tooth flanks 19 of the teeth 18 of the shaft toothing 5 between the pitch diameter DT and the major diameter Dw do not contact the tooth flanks 13 of the teeth 15.

Figure 5:
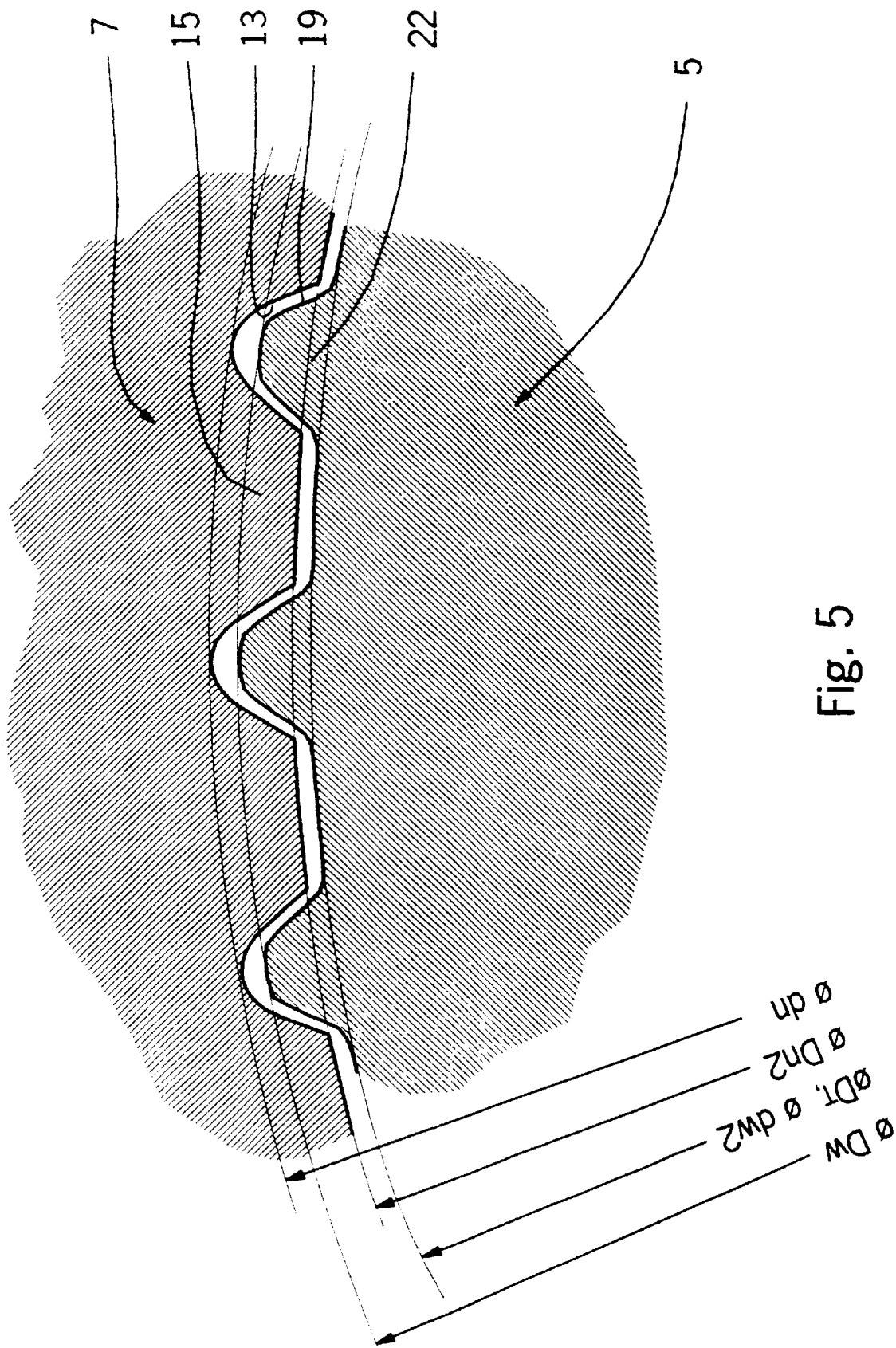

FIG. 5 shows a partial cross-section through a shaft/hub unit in the portion 10 according to FIG. 1. The hub toothing 7 is identical to the hub toothing in FIG. 3. The teeth 22 of the shaft toothing 5 have the same cross-section as the teeth 18 in FIG. 4 between the pitch diameter DT and the major diameter Dw. Thus, without any torque load, the tooth flanks 19 and 13 do not contact one another, thus permitting torsion of the shaft 1 when torque is introduced until, from a certain torque value onwards, the shaft 1 is twisted to such an extent that the tooth flanks 19, 13 come into contact with one another.

Figure 6:
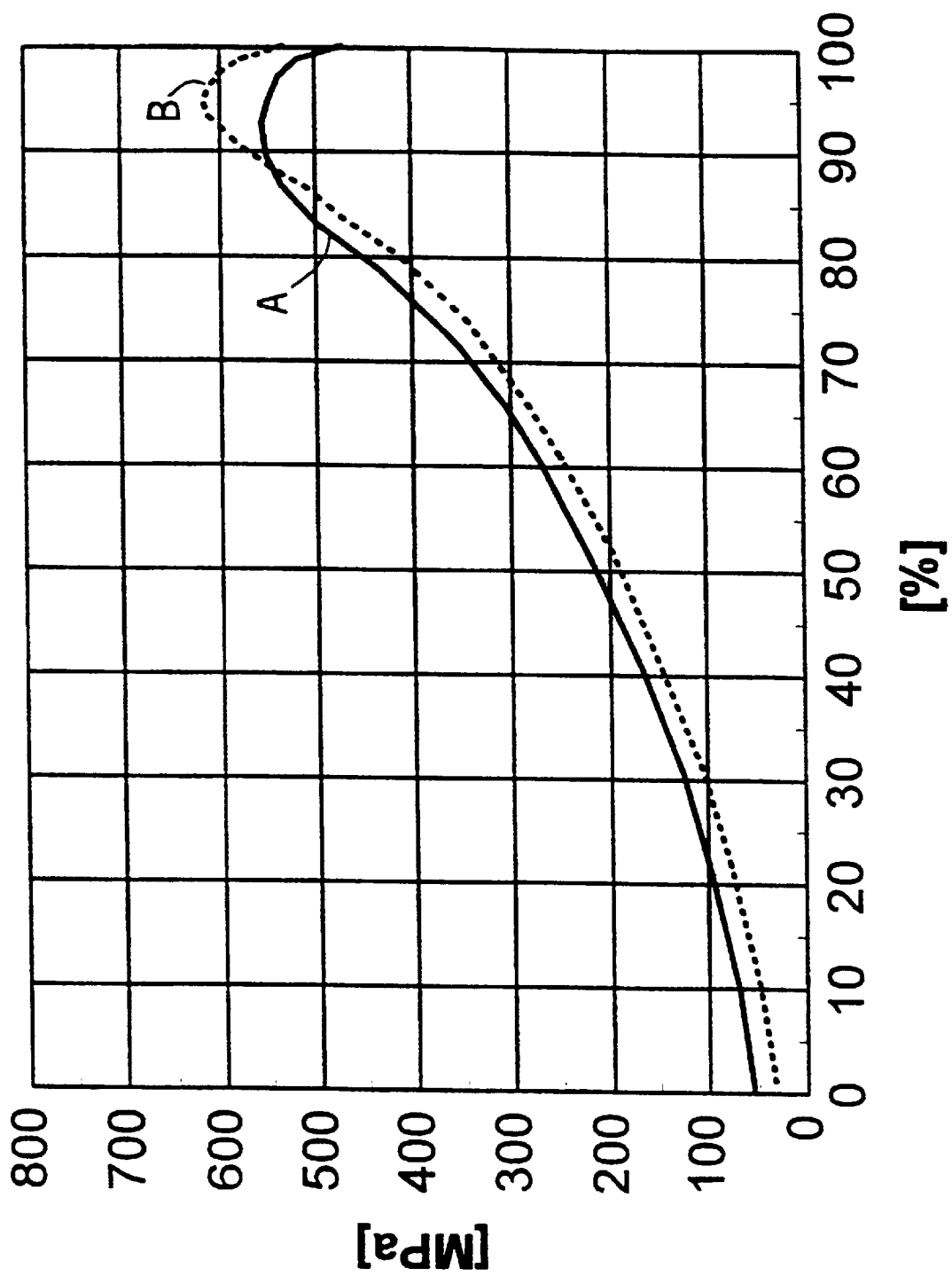

FIG. 6 shows stress curves extending along the length of the toothing assemblies. Curve A is the stress curve of an inventive shaft/hub unit according to FIGS. 2 and 3. Curve B is the stress curve of a toothing assembly according to the state of the art wherein the major diameter and the base diameter of both the hub toothing and of the shaft toothing are constant along the entire length of the toothing assembly.

It can be seen that both stress curves, starting from a low value at the toothing assembly end facing away from the shaft shank, rise continuously up to a maximum value and thereafter fall slightly. As a result of the toothing assembly design in accordance with the invention, the maximum stress value in the portion of torque introduction—due to an increase in the resistance moment of the torque—is lower than the maximum value of curve B.

Figure 7:
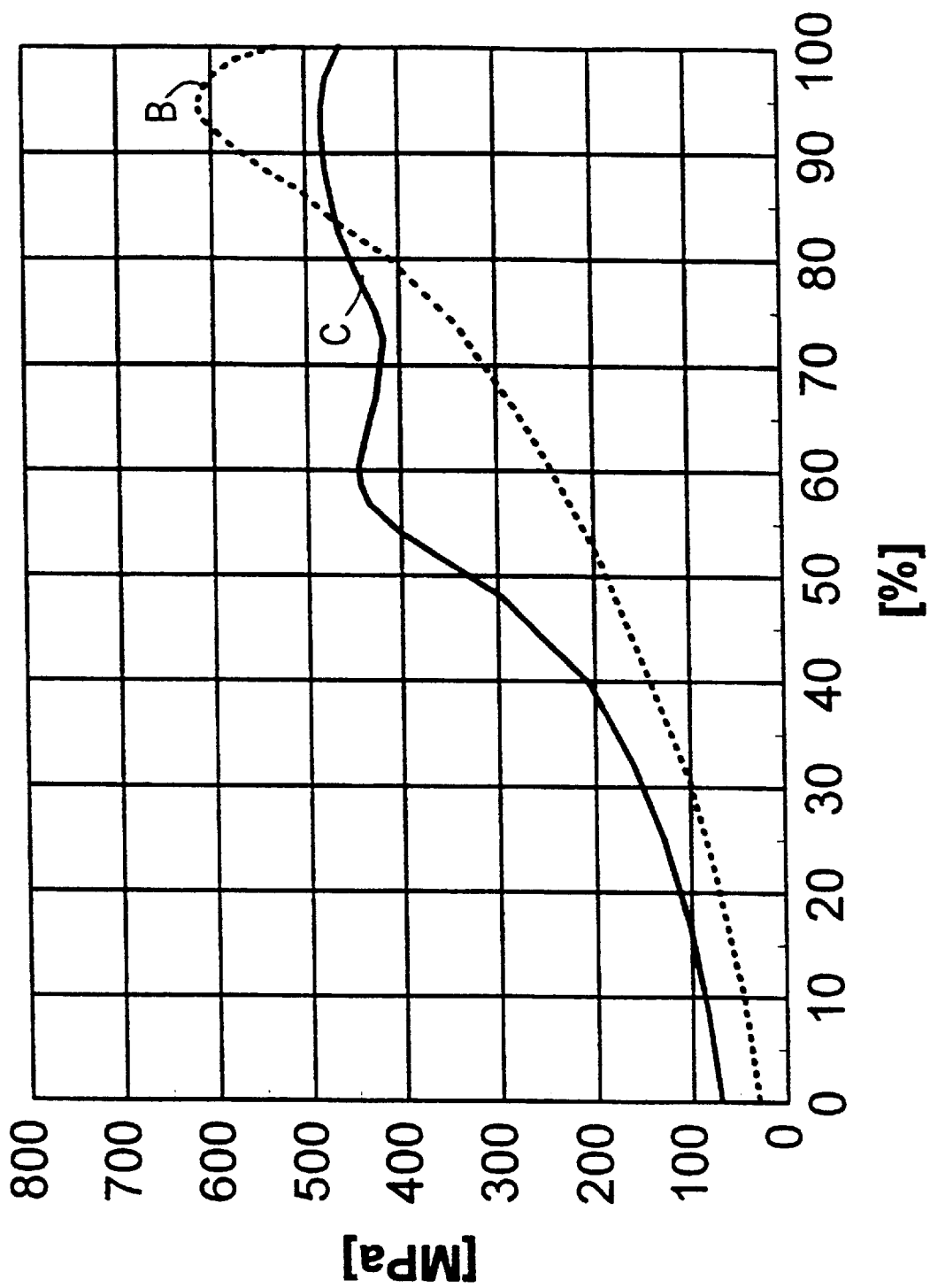

FIG. 7 shows two stress curves along the length of the toothing assemblies. Curve C is the stress curve of a shaft/hub unit according to FIGS. 4 and 5. Curve B is the stress curve of a toothing assembly according to the state of the art and is identical to curve B according to FIG. 6. Curve C, starting from a low value at the toothing assembly end facing away from the shaft shank, rises continuously up to a first maximum, then falls slightly and again rises to a second maximum. The two maximum values represent the stresses in the two portions according to FIGS. 4 and 5. Because the introduction of torque is distributed to said two portions, the stress values of the two maxima are lower than the stress maximum of curve A in FIG. 6.

What is claimed is:

1. A shaft/hub unit have a tooth assembly for transmitting torque, comprising a shaft with shaft teeth and hub teeth, said hub teeth and shaft teeth engage one another, with torque being introduced by a shaft shank at whose end there is provided said shaft teeth and with the tooth profile of said shaft teeth, in a longitudinal direction, following a variable course;

said shaft teeth having a major diameter which, in said longitudinal direction, follows a constant course and said hub teeth having a base diameter which, in said longitudinal direction, follows a constant course; and said tooth assembly having at least two axially extending portions in which each base diameter of said shaft teeth follows a constant course and in which each major diameter of said hub teeth follows a constant course, and of each two adjoining portions, a portion facing said shaft shank has the greater base diameter of said shaft teeth and a greater major diameter of said hub teeth; and of each two adjoining portions, a portion facing said shaft shank has a tooth profile of said shaft teeth which tooth profile corresponds to a head portion of an adjoining portion, which head portion forms an upper part of said tooth profile.

2. A shaft/hub unit according to claim 1, wherein of said tooth profiles of each two adjoining portions, said tooth profile of said shaft teeth of that portion facing away from said shaft shank is widened in steps below the head portion forming an upper part of the tooth profile whose profile corresponds to the tooth profile of the adjoining portion; and wherein tooth flanks of said shaft teeth of that portion positioned at the shaft end contact tooth flanks of the hub teeth in only one tooth base portion forming a lower part of the tooth profile.

3. A shaft/hub unit according to one of claims 1 or claim 2, wherein between each two adjoining portions, there is provided a portion of transition in which, in said longitudinal direction from the base diameter of the one portion to the base diameter of the other portion, the value of the base diameter of said shaft teeth follows a continuous function, and in which, in the longitudinal direction from the major diameter of the one portion to the major diameter of the other portion, the value of the major diameter of said hub teeth follows a continuous function.

4. A shaft/hub unit according to one of claims 1 or 2 wherein in the portion which is furthest removed from said shaft shank said hub teeth and said shaft teeth, are each provided with a circumferential groove for receiving an axial securing element.

5. A shaft/hub unit according to one of claims 1 or 2, wherein between each two adjoining portions, there is provided a portion of transition in which, in said longitudinal direction from the base diameter of the one portion to the base diameter of the other portion, the value of the base diameter of said shaft teeth follows a continuous function, and in which, in the longitudinal direction from the major diameter of the one portion to the major diameter of the other portion, the value of the major diameter of said hub teeth follows a continuous function.

6. A shaft/hub unit according to claim 1, wherein in the portion which is furthest removed from said shaft shank said hub teeth and said shaft teeth, are each provided with a circumferential groove for receiving an axial securing element.

7. A shaft/hub unit according to claim 6, wherein said securing element is a retaining ring with a round cross-section.

8. A shaft/hub unit according to claim 2, wherein in the portion which is furthest removed from said shaft shank said hub teeth and said shaft teeth, are each provided with a circumferential groove for receiving an axial securing element.

9. A shaft/hub unit according to claim 8, wherein said securing element is a retaining ring with a round cross-section.

10. A shaft/hub unit according to claim 4, wherein said securing element is a retaining ring with a round cross-section.

* * * * *